T. BROWN.
CORN SHELLER.
APPLICATION FILED JAN. 28, 1916.
1,323,522.
Patented Dec. 2, 1919.
2 SHEETS—SHEET 1.
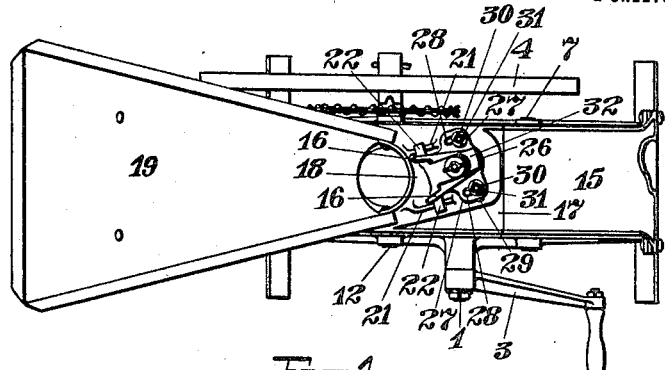
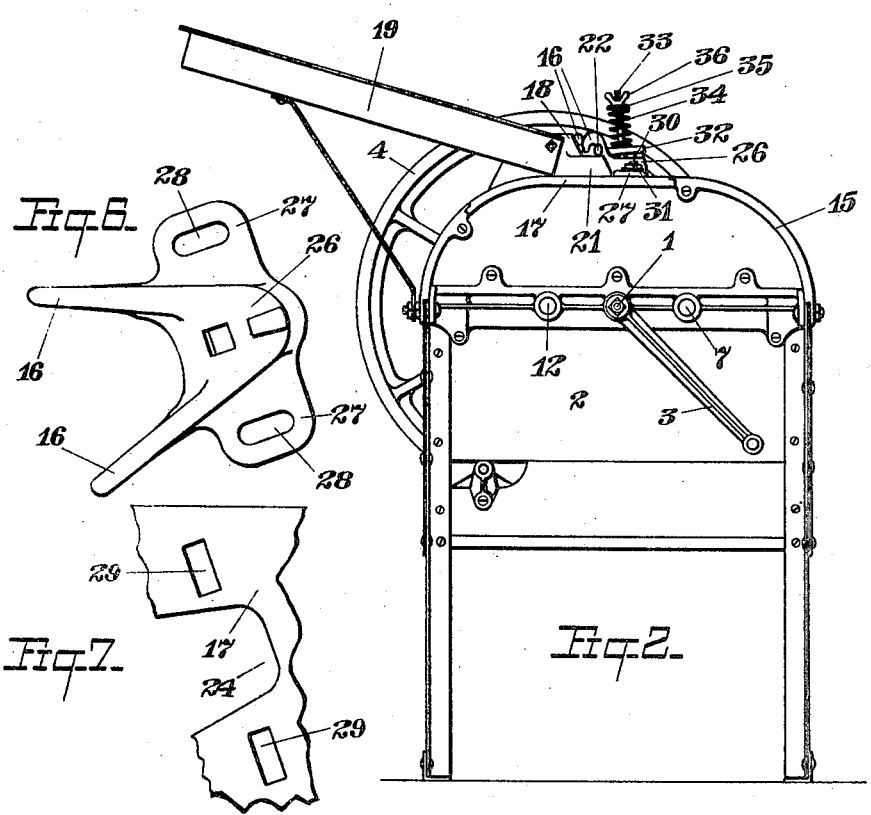

T. BROWN.
CORN SHELLER.
APPLICATION FILED JAN. 28, 1916.
1,323,522.
Patented Dec. 2, 1919.
2 SHEETS—SHEET 2.
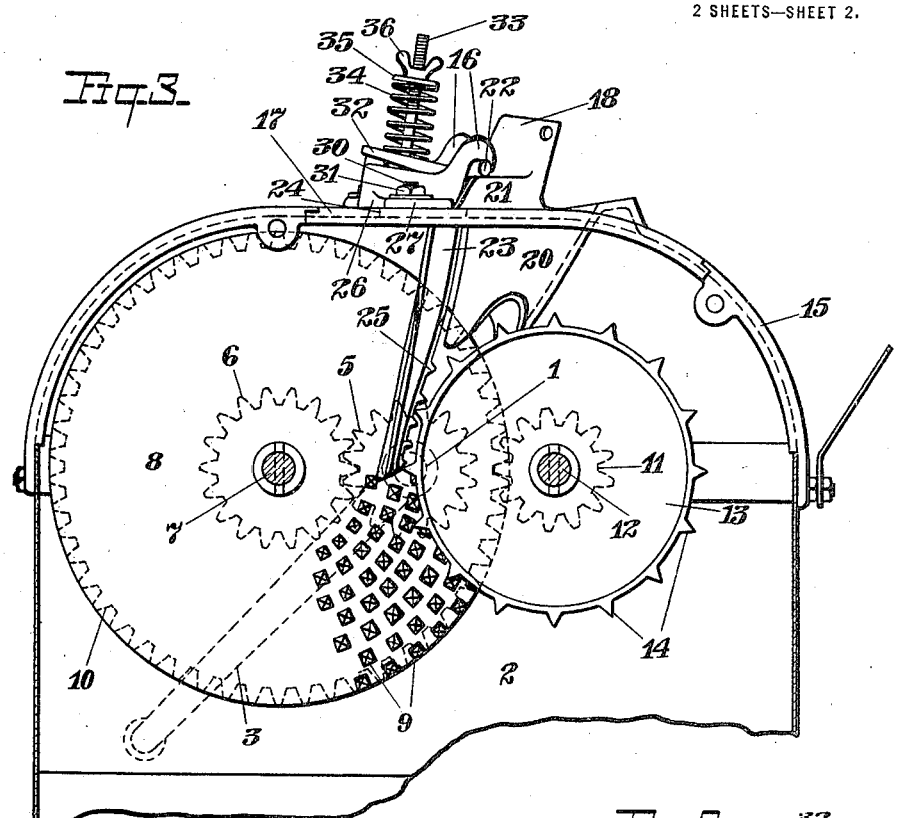
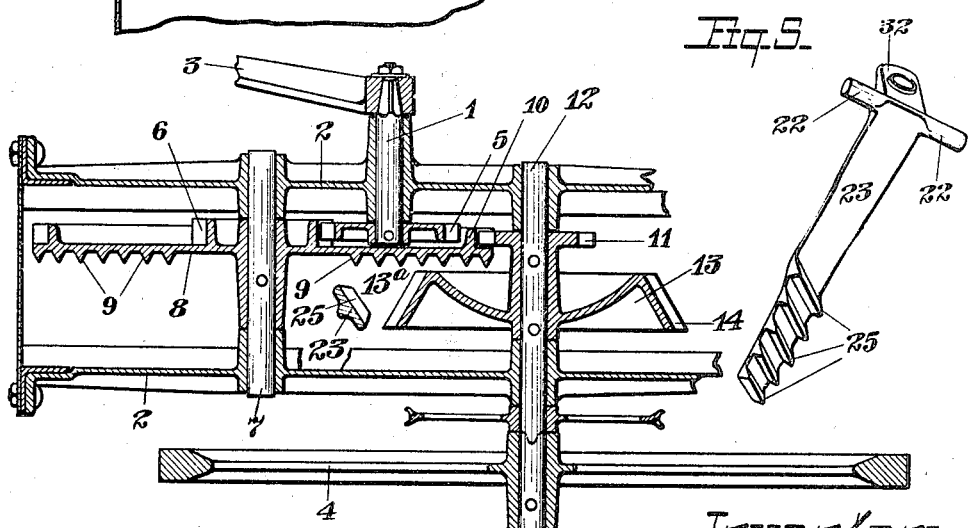
Witness:
Martin Peterson.
Inventor:
Theophilus Brown
by W.C. Jrdington
his Attorney.

UNITED STATES PATENT OFFICE.

THEOPHILUS BROWN, OF MOLINE, ILLINOIS, ASSIGNOR, BY MESNE ASSIGNMENTS, TO DEERE & COMPANY, OF MOLINE, ILLINOIS, A CORPORATION OF ILLINOIS.

CORN-SHELLER.

1,323,522.    Specification of Letters Patent.    Patented Dec. 2, 1919.

Application filed January 28, 1916. Serial No. 74,772.

*To all whom it may concern:*

Be it known that I, THEOPHILUS BROWN, a citizen of the United States, residing at Moline, in the county of Rock Island and State of Illinois, have invented certain new and useful improvements in Corn-Shellers, of which the following is a specification, reference being had therein to the accompanying drawing.

My invention relates to corn shellers and has for its object the construction of a sheller in which a part of the mechanism is made readily and easily adjustable for large or small corn.

Referring to the drawings in which similar numerals indicate identical parts—

Figure 1 is a plan view of my improved sheller.

Fig. 2 is a side elevation.

Fig. 3 is an enlarged view with a side of the casing removed and showing the shelling mechanism.

Fig. 4 is an enlarged plan view with the top of the casing removed.

Fig. 5 is a perspective view of the rag iron, and

Figs. 6 and 7 are details.

A shaft 1, by the rotation of which the mechanism of the sheller is actuated, is journaled in suitable bearings on the sides of a casing 2. In the drawings I have shown a hand crank 3 to actuate the shaft 1, but the latter can be provided with a pulley for actuation by mechanical power. Rigidly secured on the shaft 1 is a pinion 5, which meshes with a gear 6 rigidly mounted on a shaft 7 journaled in bearings on the casing 2; a shaft 12 projects beyond the side of the casing 2, opposite the hand crank 3, and has mounted upon it a flywheel 4. The gear 6 is preferably integral with a shelling disk 8, mounted on the shaft 7, the face of which is provided with the usual shelling teeth 9, a few only of the latter being shown in the drawings; on the rear of the periphery of the disk 8 is a gear 10 which engages with a pinion 11 on the shaft 12, the pinion 11 being preferably integral with the hub of a bevel shelling wheel 13, the latter having laterally extending teeth 14 on its bevel periphery.

A top 15 covers the casing 2 and is formed in part by a plate 17 having an upwardly extending chute 18 to which a feed table 19 is secured. On the underside of the plate 17 is a chute 20 extending downwardly in close proximity to the shelling disk 8 and the bevel shelling wheel 13. Extending from the chute 18 are parallel ribs 21 adapted to form a support for arms 22 projecting from opposite sides of a rag iron 23; the rag iron 23 extends downward through an opening 24 in the plate 17 and has a series of laterally disposed teeth 25 on its face which incline downwardly toward the shelling wheel 8. Mounted on the plate 17 is a member 26 having oppositely extending projections 27 provided with slots 28; similar slots 29 are in the plate 17 and at right angles to the slots 28, and I secure a member 26 to the plate 17 by bolts 30 which pass through the slots 28 and 29 and are tightened by nuts 31. Preferably integral with the main portion of the rag iron 23, and projecting at right angles therefrom, is an arm 32 which rests upon the upper surface of the member 26. A bolt 33 extends upward through the member 26 and through the arm 32 and has thereon a coil spring 34 which exerts its pressure against the arm 32 and a washer 35 between the spring 34 and a thumb screw 36 on the upper and threaded end of the bolt 33.

Referring to Fig. 4 it will be noted that the face of the rag iron 23 and the shelling disk 8 and the shelling wheel 13 forms an angular opening 13ª through which the corn must travel; the coiled spring 34 holds the rag iron 23 so that the latter will yield to accommodate unevenness in the ears of corn, the arms 22 rocking on the ribs 21 of the chute 18, the pressure of the spring 34 on the rag iron 23 being regulated by turning the thumb screw 36.

Integral with the member 26 are arms 16 having their free ends formed into hooks which clasp the arms 22 of the rag iron 23, compelling a simultaneous movement of the rag iron with the member 26. The slots 29 extend at an angle laterally of the plate 17 so that adjustment of the member 26 can be made to move the rag iron 23 toward or from the shelling disk 8. The slots 28 are at right angles to the slots 29 so that the rag iron can be adjusted toward the shelling disk 8 and the shelling wheel 13.

Different types of corn present varying characteristics, one variety will be distinguished by thinness of ears, and another variety will have ears of pronounced thickness, these differences require a range of adjustment other than provided by the spring 34, consequently I have provided the slots in the plate 17 and the member 26 so that the rag iron 23, when the bolts 30 are loosened, can be adjusted by moving the member 26 and the rag iron 23 connected therewith toward or from the shelling wheels 8 and 13 or away therefrom, to change the size of the opening 13ª to accommodate any type of corn, and after the desired adjustment is made the member 26 and the rag iron 23 are secured in the new position by tightening the nuts 31. Usually in this type of machine the chutes 20 and the rag iron are connected in such a manner that independent adjustment of the latter cannot be effected, adjustment of the rag iron necessitating a movement of the chute 20. As shown and described in my device the rag iron 23 and chute 20 are not connected in any way the latter having a fixed position in relation to the shelling wheels from which it is immovable except by removing the plate 17 of which it preferably forms a part; by constructing the rag iron 23 as a separate part and mounting it as shown and described a greater range of adjustment to accommodate varying types of corn is possible and the adjustment is quickly and more readily accomplished.

The range of adjustment permits the rag iron 23 to be moved toward either of the shelling wheels 8 and 13 or toward both at the same time, and by utilizing one of the bolts 30 as a pivot, the rag iron 23 can be swung about a vertical axis to change its relation to the shelling disks 8 and 13 and to vary the form of the angular opening 13ª. It will also be noted that the rag iron 23 can be readily removed and replaced for any desired purpose without removing other parts of the mechanism of my device. It will be readily understood, that, as usual in this type of machine, motion is given to the shelling wheels 8 and 13 by rotation of the shaft 1 and the gears connecting it with the shelling wheels.

I do not limit myself to a rag iron having a flat face as shown, it being evident that a rag iron having a concave or convex face may be employed without change in the spirit and efficiency of my invention.

What I claim is—

1. In a corn-sheller, having in combination, a casing, shelling wheels within the casing, slots in the casing, a member on the casing having slots overlying the slots in the casing and at an angle thereto, bolts projecting through said slots and about which said member is adapted to be adjusted and held in position, and a rag iron connected to said member and simultaneously adjustable therewith.

2. In a corn-sheller, having in combination, a casing, shelling wheels within the casing, slots in the casing, a member on the casing having slots overlying the slots in the casing and at an angle thereto, bolts projecting through said slots and about which said member is adjustable in any direction and held in position by said bolts, and a rag iron connected to said member and simultaneously adjustable therewith.

3. In a corn-sheller, having in combination, a casing, shelling wheels within the casing, a rag iron projecting downwardly within the casing adjacent to the shelling wheels, oppositely extending arms on the upper part of the rag iron resting on supports on the casing, an adjustable member mounted on the casing, an arm on the rag iron connected to said member, and means on the member to engage with the oppositely extending arms on the rag iron to hold said arms on the supports and to move the rag iron toward or from the shelling wheels by the adjustment of said member.

4. In a corn-sheller, having in combination, a casing, shelling wheels within the casing, a rag iron projecting downwardly within the casing adjacent to the shelling wheels, oppositely extending arms on the upper part of the rag iron resting on supports on the casing, an adjustable member mounted on the casing, an arm on the rag iron connected to said member, arms extending from said member and having hooks to engage with the oppositely extending arms on the rag iron to hold them on their supports and to move the rag iron toward or from the shelling wheels by the adjustment of said member.

5. In a corn-sheller, having in combination, a casing, shelling wheels within the casing, a rag iron projecting downwardly within the casing adjacent to the shelling wheels, oppositely extending arms on the rag iron resting on supports on the casing, an adjustable member mounted on the casing, an arm on the rag iron connected to said member by a bolt thereon adapted to project through an opening in said arm, a nut on the free end of the bolt, a coil spring on the bolt between the nut and said arm, means to adjust said member, and means connecting said member and the oppositely extending arms on the rag iron to move the latter toward or from the shelling wheels by the adjustment of said member.

6. In a corn-sheller, having in combination, shelling wheels, a chute rigidly supported in fixed relation to the shelling wheels and through which corn is passed to be shelled, a rag iron forming with the shelling wheels an angular passage to receive corn from the chute, and means to adjust the rag iron about a vertical axis forward of the chute to vary its angular relation to the shelling wheels.

7. In a corn-sheller, having in combination, shelling wheels, a chute rigidly supported in fixed relation to the shelling wheels and through which corn is passed to be shelled, a rag iron forming with the shelling wheels an angular passage to receive corn from the chute, and means to adjust the rag iron about a vertical axis forward of the chute toward one of the shelling wheels to vary its angular relation to both of said wheels.

8. In a corn-sheller, having in combination, a casing, shelling wheels within the casing, a chute within the casing adjacent the shelling wheels and through which corn is passed to be shelled, a rag iron forming with the shelling wheels an angular passage to receive corn from the chute, and means to adjust the rag iron only about a vertical axis forward of the chute toward or from the shelling wheels to vary its angular relation to the latter.

In testimony whereof I affix my signature, in presence of two witnesses.

THEOPHILUS BROWN.

Witnesses:
 JESSIE SIMSER,
 W. G. DUFFIELD.